US011115863B2

(12) United States Patent
Wang et al.

(10) Patent No.: US 11,115,863 B2
(45) Date of Patent: Sep. 7, 2021

(54) CONNECTION ESTABLISHEMENT IN A CELLULAR NETWORK

(71) Applicant: Telefonaktiebolaget LM Ericsson (publ), Stockholm (SE)

(72) Inventors: Zhong Wang, Nanjing (CN); Peng Lv, Nanjing (CN); Hai Wang, Beijing (CN); Haiming Bai, Nanjing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/958,356

(22) PCT Filed: Dec. 27, 2017

(86) PCT No.: PCT/CN2017/119011
§ 371 (c)(1),
(2) Date: Jun. 26, 2020

(87) PCT Pub. No.: WO2019/127103
PCT Pub. Date: Jul. 4, 2019

(65) Prior Publication Data
US 2020/0396642 A1   Dec. 17, 2020

(51) Int. Cl.
*H04W 72/00* (2009.01)
*H04W 28/08* (2009.01)
(52) U.S. Cl.
CPC .................................. *H04W 28/08* (2013.01)
(58) Field of Classification Search
CPC ... H04W 60/005; H04W 60/02; H04W 60/04; H04W 64/00; H04W 68/00;
(Continued)

(56) References Cited

U.S. PATENT DOCUMENTS 7,729,366 B2* 6/2010 Mok ........................ H04L 45/00
370/401
9,800,996 B2* 10/2017 Hwang .................... H04W 4/70
(Continued)

FOREIGN PATENT DOCUMENTS

CN   101321134 A   12/2008
CN   103354988 A   10/2013
(Continued)

OTHER PUBLICATIONS

International Search Report and Written Opinion for International Patent Application No. PCT/CN2017/119011, dated Sep. 18, 2018, 10 pages.
(Continued)

*Primary Examiner* — Huy C Ho
(74) *Attorney, Agent, or Firm* — Withrow & Terranova, PLLC

(57) ABSTRACT

A method for communications is proposed. The method may comprise obtaining, by a terminal device, network addresses of another terminal device from a message broker to which the terminal device and the another terminal device are registered. At least one of the terminal device and the another terminal device is connected to a cellular network. The method may further comprise initiating a connectivity check procedure to determine one or more candidate paths through which the terminal device has connectivity to the another terminal device. The one or more candidate paths are from at least two paths associated with the network addresses of the another terminal device. The method may further comprise selecting a path for the terminal device and the another terminal device among the one or more candidate paths, based at least in part on a predefined criterion.

9 Claims, 8 Drawing Sheets

(58) Field of Classification Search
CPC ....... H04W 68/005; H04W 8/10; H04W 8/12; H04W 8/00; H04W 8/005; H04W 8/02; H04W 8/04; H04W 8/06; H04W 8/087; H04W 8/14; H04W 36/045; H04W 92/02; H04W 36/0079; H04W 36/30; H04W 36/305; H04W 88/06; H04W 8/26
USPC ........................................................ 455/435.1
See application file for complete search history.

(56) References Cited

U.S. PATENT DOCUMENTS

| | | | | |
|---|---|---|---|---|
| 2007/0047585 | A1* | 3/2007 | Gillespie | H04L 61/2567 370/475 |
| 2008/0005290 | A1* | 1/2008 | Nykanen | H04L 63/029 709/222 |
| 2013/0067086 | A1* | 3/2013 | Hershko | H04L 61/157 709/225 |
| 2015/0188882 | A1 | 7/2015 | Wang et al. | |
| 2015/0350599 | A1* | 12/2015 | Yang | H04W 76/15 348/14.02 |
| 2017/0142164 | A1 | 5/2017 | Moore et al. | |

FOREIGN PATENT DOCUMENTS

| | | |
|---|---|---|
| CN | 103370908 A | 10/2013 |
| EP | 2001204 A1 | 12/2008 |
| WO | 2016044724 A2 | 3/2016 |

OTHER PUBLICATIONS

Tseng, Chien-Chao, et al., "WiFi assisted NAT traversal scheme for surveillance patrol robot," Nonlinear Dyn, vol. 76, Issue 1, Mar. 2013, Springer, 12 pages.

Extended European Search Report for European Patent Application No. 17936902.0, dated Jul. 9, 2021, 9 pages.

* cited by examiner

CONNECTION ESTABLISHEMENT IN A CELLULAR NETWORK

This application is a 35 U.S.C. § 371 national phase filing of International Application No. PCT/CN2017/119011, filed Dec. 27, 2017, the disclosure of which is incorporated herein by reference in its entirety.

FIELD OF THE INVENTION

The present disclosure generally relates to communication networks, and more specifically, to connection establishment in a cellular network.

BACKGROUND

This section introduces aspects that may facilitate a better understanding of the disclosure. Accordingly, the statements of this section are to be read in this light and are not to be understood as admissions about what is in the prior art or what is not in the prior art.

With the development of data communication and equipment manufacturing technologies, various communication devices are designed and utilized to support diversified services. Recently, a case of sharing a video captured in the air using a camera embedded in a drone over a social network is increasing. The drone may comprise, for example, an unmanned aerial vehicle (UAV) or a flying object of such a shape as a plane or a helicopter flying by a control signal of a radio wave while not carrying a human. A variety of communication devices such as drones and remote controllers have been developed for recreational and industrial uses such as aerial photography and information collection. A drone may receive control commands from its controller, and send the real time video and other information collected by sensors on the drone back to the controller. In some applications, communications between the drone and its controller may be across a large geographic area and/or subjected to many kinds of interference. Therefore, there may be a need to enhance connectivity between communication devices such as the drone and its controller.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

The unmanned vehicle technology is very popular in personal entertainment such as photographing. Now its usage has been extended to industry areas such as agriculture fertilizing and insect prevention, geography information graphing, etc. These application scenarios may require a drone to realize long-distance communication with a remote controller. However, currently the drone and its controller are connected through a wireless fidelity (Wi-Fi) network or a Bluetooth network which generally supports short-distance communication. Therefore, it may be desirable to extend the communication range of the drone and its controller.

The present disclosure proposes a solution of connection establishment in a cellular network, which can enable a peer to peer (P2P) connection between two terminal devices such as a drone and its controller to be established over the cellular network, so that the connectivity between the two terminal devices may be improved to fulfil various requirements of services.

According to a first aspect of the present disclosure, there is provided a method implemented at a terminal device. The method may comprise obtaining network addresses of another terminal device from a message broker to which the terminal device and the another terminal device are registered. At least one of the terminal device and the another terminal device is connected to a cellular network. The method may further comprise initiating a connectivity check procedure to determine one or more candidate paths through which the terminal device has connectivity to the another terminal device. The one or more candidate paths are from at least two paths associated with the network addresses of the another terminal device. The method may further comprise selecting a path for the terminal device and the another terminal device among the one or more candidate paths, based at least in part on a predefined criterion.

In accordance with an exemplary embodiment, the at least two paths may comprise two or more of a local path, a public path and a relay path. The local path is associated with an internal network address of the another terminal device, and the public and relay paths are associated with external network addresses of the another terminal device.

In accordance with an exemplary embodiment, the network addresses of the another terminal device may comprise one or more network addresses inquired by the another terminal device from a server which can support traversal for network address translation.

In accordance with an exemplary embodiment, the method according to the first aspect of the present disclosure may further comprise inquiring at least one of network addresses of the terminal device from the server.

In accordance with an exemplary embodiment, the method according to the first aspect of the present disclosure may further comprise sending the network addresses of the terminal device to the another terminal device through the message broker.

In accordance with an exemplary embodiment, the method according to the first aspect of the present disclosure may further comprise establishing a peer to peer connection for the terminal device and the another terminal device via the selected path over the cellular network.

In accordance with an exemplary embodiment, the establishment of the peer to peer connection may comprise exchanging one or more connection setup messages with the another terminal device through the message broker.

According to a second aspect of the present disclosure, there is provided an apparatus. The apparatus may comprise one or more processors and one or more memories comprising computer program codes. The one or more memories and the computer program codes may be configured to, with the one or more processors, cause the apparatus at least to perform any step of the method according to the first aspect of the present disclosure.

According to a third aspect of the present disclosure, there is provided a computer-readable medium having computer program codes embodied thereon which, when executed on a computer, cause the computer to perform any step of the method according to the first aspect of the present disclosure.

According to a fourth aspect of the present disclosure, there is provided an apparatus. The apparatus may comprise an obtaining unit, an initiating unit and a selecting unit. In accordance with some exemplary embodiments, the obtaining unit may be operable to carry out at least the obtaining step of the method according to the first aspect of the present disclosure. The initiating unit may be operable to carry out at least the initiating step of the method according to the first aspect of the present disclosure. The selecting unit may be operable to carry out at least the selecting step of the method according to the first aspect of the present disclosure.

According to a fifth aspect of the present disclosure, there is provided a method implemented at a terminal device. The method may comprise collecting network addresses of the terminal device. The method may further comprise sending the network addresses of the terminal device to another terminal device through a message broker to which the terminal device and the another terminal device are registered. At least one of the terminal device and the another terminal device is connected to a cellular network. The method may further comprise responding to a connectivity check procedure initiated from the another terminal device to determine one or more candidate paths through which the another terminal device has connectivity to the terminal device. Through the connectivity check procedure, a path for the terminal device and the another terminal device may be selected by the another terminal device from the one or more candidate paths based at least in part on a predefined criterion. The one or more candidate paths are from at least two paths associated with the network addresses of the terminal device.

In accordance with an exemplary embodiment, the at least two paths may comprise two or more paths of a local path, a public path and a relay path. The local path is associated with an internal network address of the terminal device, and the public and relay paths are associated with external network addresses of the terminal device.

In accordance with an exemplary embodiment, the collection of the network addresses of the terminal device may comprise inquiring at least one of the network addresses of the terminal device from a server which can support traversal for network address translation.

In accordance with an exemplary embodiment, the method according to the fifth aspect of the present disclosure may further comprise obtaining network addresses of the another terminal device from the message broker.

In accordance with an exemplary embodiment, the network addresses of the another terminal device may comprise one or more network addresses inquired by the another terminal device from the server.

In accordance with an exemplary embodiment, the method according to the fifth aspect of the present disclosure may further comprise establishing a peer to peer connection for the terminal device and the another terminal device via the selected path over the cellular network.

In accordance with an exemplary embodiment, the establishment of the peer to peer connection may comprise exchanging one or more connection setup messages with the another terminal device through the message broker.

According to a sixth aspect of the present disclosure, there is provided an apparatus. The apparatus may comprise one or more processors and one or more memories comprising computer program codes. The one or more memories and the computer program codes may be configured to, with the one or more processors, cause the apparatus at least to perform any step of the method according to the fifth aspect of the present disclosure.

According to a seventh aspect of the present disclosure, there is provided a computer-readable medium having computer program codes embodied thereon which, when executed on a computer, cause the computer to perform any step of the method according to the fifth aspect of the present disclosure.

According to an eighth aspect of the present disclosure, there is provided an apparatus. The apparatus may comprise a collecting unit, a sending unit and a responding unit. In accordance with some exemplary embodiments, the collecting unit may be operable to carry out at least the collecting step of the method according to the fifth aspect of the present disclosure. The sending unit may be operable to carry out at least the sending step of the method according to the fifth aspect of the present disclosure. The responding unit may be operable to carry out at least the responding step of the method according to the fifth aspect of the present disclosure.

In accordance with an exemplary embodiment, the predefined criterion may comprise one or more of the following requirements: a delay requirement, a bandwidth requirement, and a reliability requirement.

In accordance with an exemplary embodiment, the connectivity check procedure may be based at least in part on at least one of the following techniques: session traversal utilities for network address translation, and traversal using relays around network address translation.

According to a ninth aspect of the present disclosure, there is provided a method implemented at a message broker. The method may comprise registering a terminal device and another terminal device at the message broker. At least one of the terminal device and the another terminal device is connected to a cellular network. The method may further comprise obtaining network addresses of the terminal device from the terminal device. The message broker may forward the network addresses of the terminal device to the another terminal device, so as to enable a path through which the another terminal device has connectivity to the terminal device to be selected by the another terminal device from at least two paths associated with the network addresses of the terminal device.

In accordance with an exemplary embodiment, the method according to the ninth aspect of the present disclosure may further comprise obtaining network addresses of the another terminal device from the another terminal device.

In accordance with an exemplary embodiment, the method according to the ninth aspect of the present disclosure may further comprise forwarding the network addresses of the another terminal device to the terminal device, so as to enable a path through which the terminal device has connectivity to the another terminal device to be selected by the terminal device from at least two paths associated with the network addresses of the another terminal device.

In accordance with an exemplary embodiment, the method according to the ninth aspect of the present disclosure may further comprise communicating one or more connection setup messages exchanged between the terminal device and the another terminal device. The one or more connection setup messages may be related to establishment of a peer to peer connection for the terminal device and the another terminal device.

According to a tenth aspect of the present disclosure, there is provided an apparatus. The apparatus may comprise one or more processors and one or more memories comprising computer program codes. The one or more memories and the computer program codes may be configured to, with the one or more processors, cause the apparatus at least to perform any step of the method according to the ninth aspect of the present disclosure.

According to an eleventh aspect of the present disclosure, there is provided a computer-readable medium having computer program codes embodied thereon which, when executed on a computer, cause the computer to perform any step of the method according to the ninth aspect of the present disclosure.

According to a twelfth aspect of the present disclosure, there is provided an apparatus. The apparatus may comprise a registering unit, an obtaining unit and a forwarding unit. In accordance with some exemplary embodiments, the registering unit may be operable to carry out at least the registering step of the method according to the ninth aspect of the present disclosure. The obtaining unit may be operable to carry out at least the obtaining step of the method according to the ninth aspect of the present disclosure. The forwarding unit may be operable to carry out at least the forwarding step of the method according to the ninth aspect of the present disclosure.

According to a thirteenth aspect of the present disclosure, there is provided a method implemented at a server. The method may comprise receiving an address request from a terminal device. The server can support traversal for network address translation. The method may further comprise determining at least one of network addresses of the terminal device, based at least in part on the address request. The server may send a response to the address request to the terminal device. The response may comprise the at least one of the network addresses of the terminal device.

In accordance with an exemplary embodiment, the network addresses of the terminal device may be applicable to enabling a path through which another terminal device has connectivity to the terminal device to be selected by the another terminal device from at least two paths associated with the network addresses of the terminal device. At least one of the terminal device and the another terminal device is connected to a cellular network.

In accordance with an exemplary embodiment, the method according to the thirteenth aspect of the present disclosure may further comprise receiving another address request from the another terminal device. Based at least in part on the another address request, the server can determine at least one of network addresses of the another terminal device.

In accordance with an exemplary embodiment, the method according to the thirteenth aspect of the present disclosure may further comprise sending another response to the another address request to the another terminal device. The another response may comprise the at least one of the network addresses of the another terminal device.

In accordance with an exemplary embodiment, the network addresses of the another terminal device may be applicable to enabling a path through which the terminal device has connectivity to the another terminal device to be selected by the terminal device from at least two paths associated with the network addresses of the another terminal device.

According to a fourteenth aspect of the present disclosure, there is provided an apparatus. The apparatus may comprise one or more processors and one or more memories comprising computer program codes. The one or more memories and the computer program codes may be configured to, with the one or more processors, cause the apparatus at least to perform any step of the method according to the thirteenth aspect of the present disclosure.

According to a fifteenth aspect of the present disclosure, there is provided a computer-readable medium having computer program codes embodied thereon which, when executed on a computer, cause the computer to perform any step of the method according to the thirteenth aspect of the present disclosure.

According to a sixteenth aspect of the present disclosure, there is provided an apparatus. The apparatus may comprise a receiving unit, a determining unit and a sending unit. In accordance with some exemplary embodiments, the receiving unit may be operable to carry out at least the receiving step of the method according to the thirteenth aspect of the present disclosure. The determining unit may be operable to carry out at least the determining step of the method according to the thirteenth aspect of the present disclosure. The sending unit may be operable to carry out at least the sending step of the method according to the thirteenth aspect of the present disclosure.

BRIEF DESCRIPTION OF THE DRAWINGS

The disclosure itself, the preferable mode of use and further objectives are best understood by reference to the following detailed description of the embodiments when read in conjunction with the accompanying drawings, in which.

DETAILED DESCRIPTION

Figure 1:
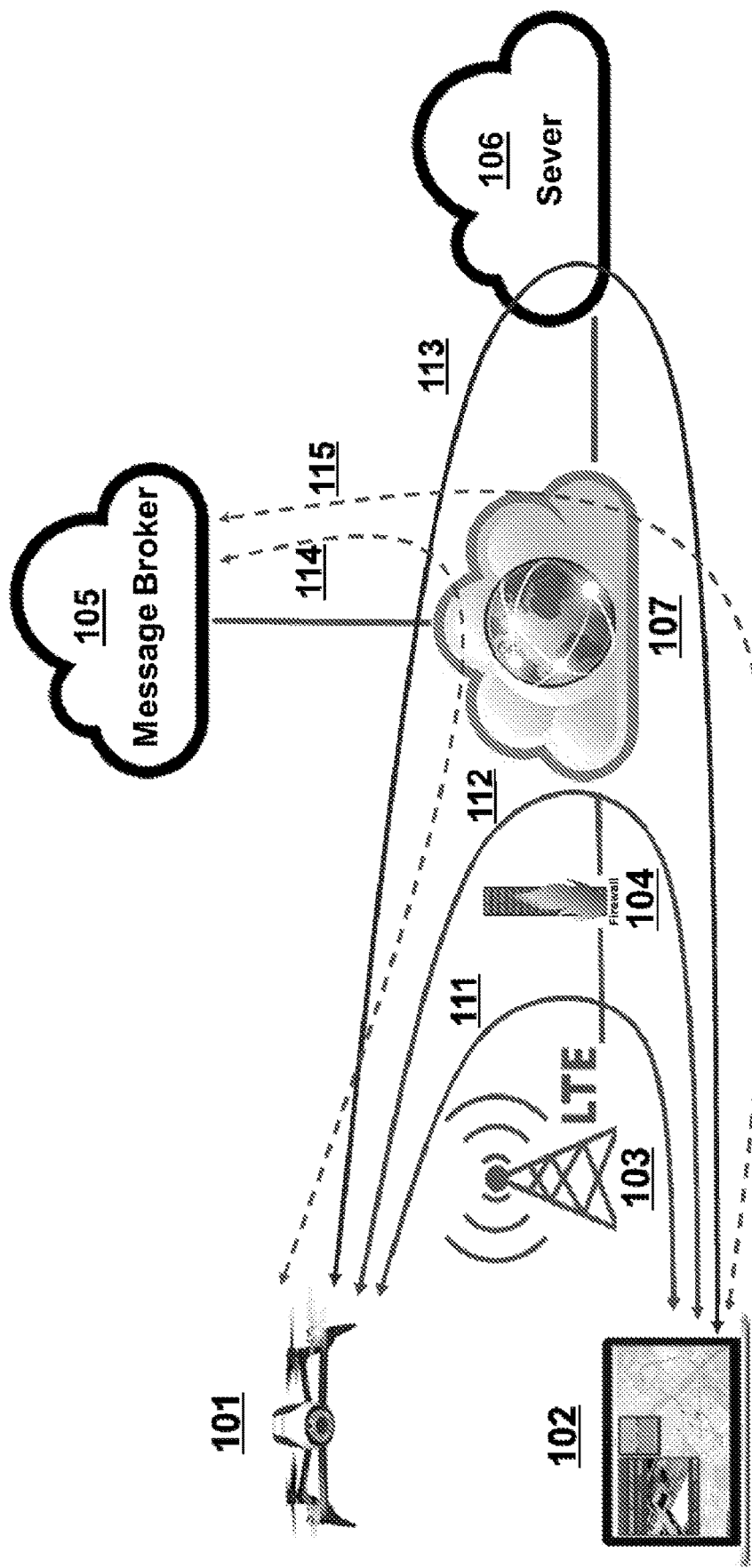
FIG. 1 is a diagram illustrating an exemplary system architecture according to an embodiment of the present disclosure.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "cellular network" refers to a network following any suitable communication standards, such as new radio (NR), long term evolution (LTE), LTE-Advanced, wideband code division multiple access (WCDMA), high-speed packet access (HSPA), and so on. Furthermore, the communications between a terminal device and a network node in the communication network may be performed according to any suitable communication protocols, including, but not limited to, the first generation (1G), the second generation (2G), 2.5G, 2.75G, the third generation (3G), 4G, 4.5G, 5G communication protocols, and/or any other protocols either currently known or to be developed in the future.

The term "network node" refers to a network device in a communication network via which a terminal device accesses to the network and receives services therefrom. The network node may refer to a base station (BS), an access point (AP), a mobile management entity (MME), multi-cell/multicast coordination entity (MCE), a gateway, a server, a controller or any other suitable device in a cellular network. The BS may be, for example, a node B (NodeB or NB), an evolved NodeB (eNodeB or eNB), a next generation NodeB (gNodeB or gNB), a remote radio unit (RRU), a radio header (RH), a remote radio head (RRH), a relay, a low power node such as a femto, a pico, and so forth.

Yet further examples of the network node comprise multi-standard radio (MSR) radio equipment such as MSR BSs, network controllers such as radio network controllers (RNCs) or base station controllers (BSCs), base transceiver stations (BTSs), transmission points, transmission nodes, MCEs, core network nodes, positioning nodes and/or the like. More generally, however, the network node may represent any suitable device (or group of devices) capable, configured, arranged, and/or operable to enable and/or provide a terminal device access to a cellular network or to provide some service to a terminal device that has accessed to the cellular network.

The term "terminal device" refers to any end device that can access a communication network and receive services therefrom. By way of example and not limitation, the terminal device may refer to a mobile terminal, a user equipment (UE), or other suitable devices. The UE may be, for example, a subscriber station, a portable subscriber station, a mobile station (MS) or an access terminal (AT). The terminal device may include, but not limited to, portable computers, image capture terminal devices such as digital cameras, gaming terminal devices, music storage and playback appliances, a mobile phone, a cellular phone, a smart phone, a tablet, a wearable device, a personal digital assistant (PDA), a vehicle, and the like.

As yet another specific example, in an Internet of things (IoT) scenario, a terminal device may represent a machine or other device that performs monitoring and/or measurements, and transmits the results of such monitoring and/or measurements to another terminal device and/or a network equipment. The terminal device may in this case be a machine-to-machine (M2M) device, which may in a 3GPP context be referred to as a machine type communication (MTC) device.

As one particular example, the terminal device may be a UE implementing the 3GPP narrow band internet of things (NB-IoT) standard. Particular examples of such machines or devices are sensors, drones, robots, controllers, metering devices such as power meters, industrial machinery, or home or personal appliances, e.g. refrigerators, televisions, personal wearables such as watches etc. In other scenarios, a terminal device may represent a vehicle or other equipment, for example, a medical instrument that is capable of monitoring and/or reporting information on its operational status or other functions associated with its operation.

As used herein, the terms "first", "second" and so forth refer to different elements. The singular forms "a" and "an" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

Unmanned vehicles have become increasingly popular in recent years, in particular for photography, surveillance, ground monitoring, spraying pesticides, emergency or rescue operations, and/or the like. For example, a drone may be well suited to monitor or surveil remotely sites, remotely situated infrastructure or other features on the ground which cannot be easily accessed by land, for example, oil or water pipelines, electric power lines, coastlines, farmland, borders, forest fires, natural disasters, etc. The drone may be manageable by an individual or some commands through a drone controller (also referred to as a controller for ease of description). The controller can send control commands to the drone and obtain some video data and/or other sensing information from the drone. Currently, the drone and its controller are usually connected through a Wi-Fi network.

However, Wi-Fi can only support short-distance communication less than 1-2 kilometers, which may not fulfill the long-distance communication requirement of industry use cases. On the other hand, Wi-Fi uses unlicensed band such as 2.4 GHz and 5 GHz and accordingly provides communication at low security level, which apparently could not match the safe level for some high security requirement. In addition, Wi-Fi has very poor interference resistance ability and thus can provide low connection quality. For example, a connection may be lost in interference zones. Further, current Wi-Fi solutions have low expansion ability and thus cannot support cloud applications and multiple connections for drones.

According to some exemplary embodiments, the present disclosure provides a solution to enable communications of a pair of devices (such as a drone and its controller) through a connection in a cellular network (such as a 4G/LTE network or a 5G/NR network), instead of Wi-Fi or other wireless connections. In accordance with some exemplary embodiments, the pair of devices may have cellular network connection capabilities, and can communicate with a message broker and a server for connectivity establishment over the cellular network. The message broker and the server can facilitate to find an optimal path to establish a connection for the pair of devices over the cellular network. In this way, the communication range of a drone and its controller may be greatly extended compared to a Wi-Fi connection. In addition, the security level and the connection quality of the communications between the drone and its controller may be improved by using a cellular network connection.

FIG. 1 is a diagram illustrating an exemplary system architecture according to an embodiment of the present disclosure. Although the subject matter described herein may be implemented in any appropriate type of system using any suitable components, the embodiments disclosed herein are described in relation to a communication system complied with the exemplary system architecture illustrated in FIG. 1. For simplicity, the system architecture of FIG. 1 only depicts some exemplary elements such as a drone 101, a controller 102, a BS 103, a firewall 104, a message broker 105, a server 106, and the Internet 107. In practice, a communication system may further include any additional elements suitable to support communication between wireless devices or between a wireless device and another communication device, such as a landline telephone, a service provider, or any other network node or terminal device. The communication system may provide communication and other types of services to one or more wireless devices to facilitate the wireless devices' access to and/or use of the services provided by, or via, the communication system.

In accordance with an embodiment of the present disclosure, the drone 101 and the controller 102 may have cellular network connection capabilities, for example, by updating their software and/or hardware with LTE/NR dongles/modems. As illustrated in FIG. 1, the drone 101 may be attached to a cellular network such as a LTE network via the BS 103 such as an eNB. Similarly, the controller 102 also may be attached to the cellular network via the BS 103 or a different BS (not shown in FIG. 1). The drone 101 and the controller 102 may work as normal UEs and get their respective Internet protocol (IP) addresses from the core network. For instance, the IP address assigned to the drone 101/controller 102 may be carried in an attach accept message during an attach procedure for the drone 101/controller 102. As an example, the IP address may be assigned as a local network address to the corresponding dongle which acts as a network adapter for the drone 101/controller 102. It could be realized that a LTE connection may not be mandatory for the controller 102 to access to the Internet 107. In the case that the controller 102 is a computer or any other device with wired network access capability, the controller 102 may directly access to the Internet 107 by using a cable broadband connection.

When the drone 101 and the controller 102 are attached or connected to the cellular network, they can communicate with one or more cloud servers (such as the message broker 105 and the server 106 deployed in the Internet 107) through the firewall 104. In accordance with some embodiments of the present disclosure, the message broker 105 may implement communication message protocols such as a message queue telemetry transport (MQTT) protocol to support message exchanges between the drone 101 and the controller 102. After the drone 101 and the controller 102 connecting to the cellular network, they can communicate with the message broker 105 via a path 114 and a path 115, respectively. The message broker 105 can coordinate and relay some MQTT messages (for example, authentication and/or signaling messages) so that the drone 101 and the controller 102 can communicate with each other. In accordance with some embodiments of the present disclosure, the server 106 can support traversal for network address translation (NAT) in an interactive connectivity establishment (ICE) framework, for example, by implementing session traversal utilities for NAT (STUN) and/or traversal using relays around NAT (TURN) protocols.

In accordance with an embodiment of the present disclosure, the message broker 105 and the server 106 may coordinate an optimal procedure for establishing connectivity between two peers, for example, by using STUN and/or TURN protocols. In this procedure, an optimal path may be found for establishing a P2P connection between the drone 101 and the controller 102. For example, a virtual private network (VPN) connection may be established for the drone 101 and the controller 102 over the optimal path in the cellular network. Through the VPN connection, the drone 10 can receive control commands from the controller 102, and the controller 102 can receive various kinds of data which are collected from the sensors on the drone 101, such as live videos taken from the drone's camera.

In accordance with an embodiment of the present disclosure, the P2P connection for the drone 101 and the controller 102 may be established over a path nominated with STUN and/or TURN protocols. For example, the P2P connection may be set up over a public path 112 as shown in FIG. 1. Optionally, a relay function of the server 106 also may be adopted by employing the TURN protocol. As an example, if the direct P2P connection requirements cannot be fulfilled, for example, due to certain firewall rules, a relay connection may be set up for the drone 101 and the controller 102 over a relay path 113. Alternatively, in case that a local connection within the cellular network is available for the drone 101 and the controller 102, a local path 111 may be used for the communication between the drone 101 and the controller 102. According to some exemplary embodiments, an optimal path (such as the local path 111, the public path 112 or the relay path 113 as shown in FIG. 1) for the connection between the drone 101 and the controller 102 can be determined, for example, by performing a connectivity check procedure such as an ICE procedure (which will be described hereafter in connection with FIG. 2).

In accordance with an embodiment of the present disclosure, the message broker 105 may be centrally deployed in the Internet 107, while the server 106 for connectivity establishment may be regionally deployed in the Internet 107. In this regard, the drone 101 and the controller 102 may be connected to the message broker 105 and the server 106 through the cellular network. By utilizing the MQTT protocol implementation in the message broker 105 and the STUN/TURN protocol implementation in the server 106, the message broker 105 and the server 106 may facilitate an ICE procedure to be performed to setup a P2P connection between the drone 101 and the controller 102, and enable IP communications on top of cellular connectivity.

Many advantages may be achieved by applying the solution proposed according to the present disclosure. For example, if the latency requirement can be fulfilled, a drone can communicate with its controller on top of cellular connectivity with unlimited control distance, since a cellular network has much wider coverage than a Wi-Fi network. The drone may be controlled from different places, while the communication distance may be greatly extended compared to a Wi-Fi connection. On the other hand, the cellular network is operable in licensed band with high security. Therefore, the drone can be served at a high security level and fly much safer than in the Wi-Fi network. The cellular network also has high interference resistance ability, so the connection over the cellular network is robust and has good quality. In addition, the cellular network according to some exemplary embodiments may be equipped with edge and cloud computing solutions and accordingly can provide unlimited computing capability for the drone to implement some advanced functions with wide expansion ability. Furthermore, group flight capability also may be supported by the proposed solution and thus one controller can control more than one drone at a time with a cellular network connection.

It is noted that some embodiments of the present disclosure are mainly described in relation to LTE or NR specifications being used as non-limiting examples for certain exemplary network configurations and system deployments. As such, the description of exemplary embodiments given herein specifically refers to terminology which is directly related thereto. Such terminology is only used in the context of the presented non-limiting examples and embodiments, and does naturally not limit the present disclosure in any way. Rather, any other system configuration or radio technologies may equally be utilized as long as exemplary embodiments described herein are applicable.

Figure 2:
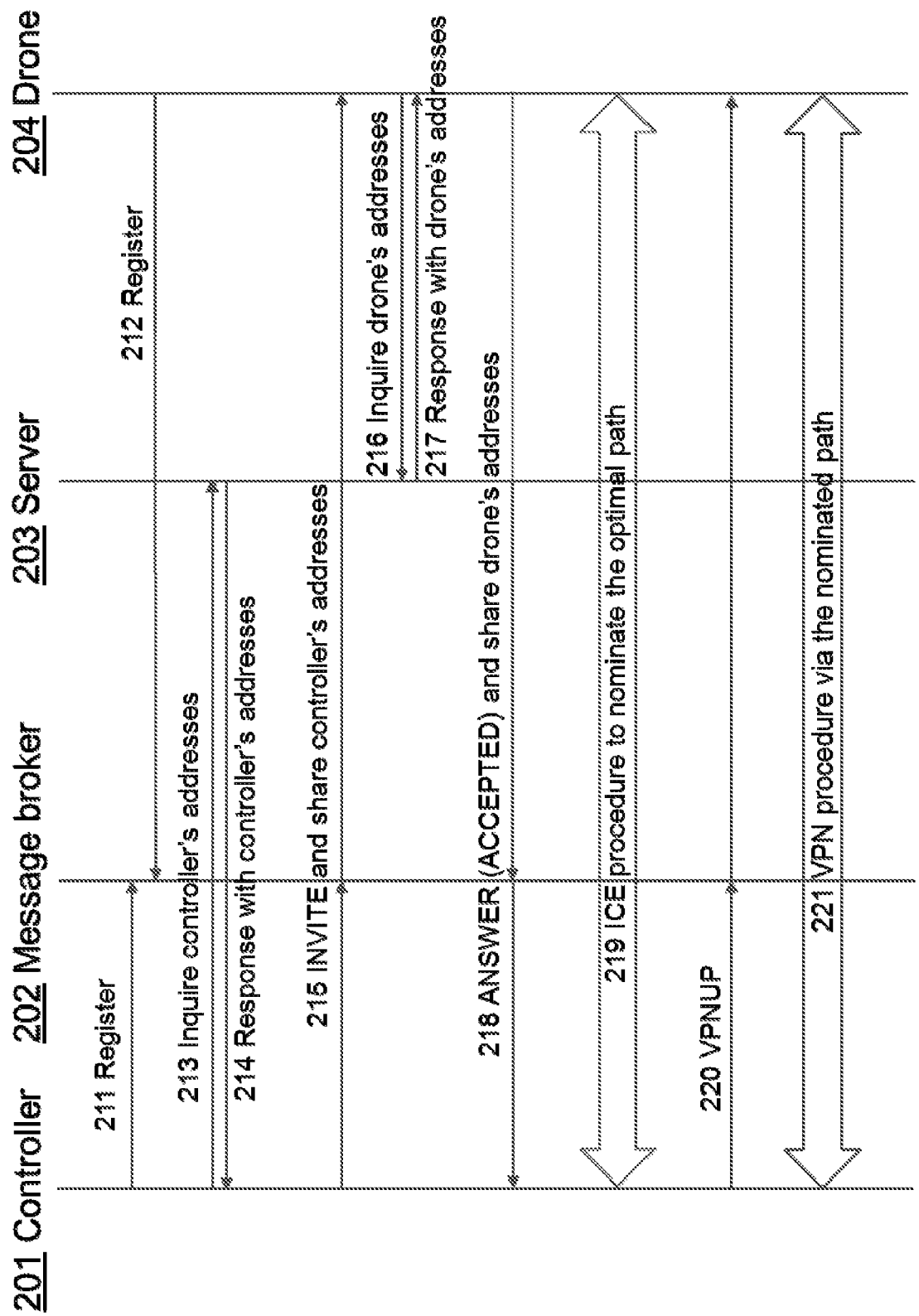
FIG. 2 is a diagram illustrating an exemplary connection setup procedure according to an embodiment of the present disclosure.

FIG. 2 is a diagram illustrating an exemplary connection setup procedure according to an embodiment of the present disclosure. For simplicity, FIG. 2 only depicts some exemplary network elements such as a controller 201, a message broker 202, a server 203 and a drone 204. It will be appreciated that signaling messages and network elements shown in FIG. 2 are just as examples, and more or less alternative signaling messages and network elements may be involved in the connection setup procedure.

In accordance with an embodiment of the present disclosure, the controller 201 may comprise a UE, a manage equipment, a monitor or a computer. The controller 201 can access Internet services through a cellular network or a cable broadband connection. The drone 204 may comprise an unmanned vehicle, a remotely piloted aircraft or a robotic aircraft. The drone 204 can connect to the Internet through a cellular network or other suitable radio access networks. Although the message flow in FIG. 2 is illustrated in connection with the UAV application, the exemplary connection setup procedure also may be applicable to other communication scenarios where some end device and terminal equipment may be able to implement similar capabilities described with respect to the controller 201 and the drone 204.

The drone 204 and its controller 201 as shown in FIG. 2 may be connected to a cellular network such as a LTE/NR network. Some cloud servers such as the message broker 202 and the server 203 can enable P2P IP communications between the drone 204 and the controller 201 on top of cellular connectivity. As described in connection with FIG. 1, the message broker 202 may implement the MQTT protocol for signaling exchanges between the drone 204 and the controller 201. The server 203 may be implemented as an ICE server which can be configured with a STUN function and/or a TURN function. In the ICE framework, the optimal IP route exploration may be performed between the controller 201 and the drone 204.

According to the exemplary connection setup procedure illustrated in FIG. 2, in order to establish a communication connection with the drone 204, the controller 201 connected to the cellular network can register 211 to the message broker 202 such as a MQTT server, for example, by sending a connect request command to the MQTT server and receiving a connect request acknowledgement message from the MQTT server. According to an exemplary embodiment, the controller 201 may communicate with the server 203 to inquire 213 the controller's external network addresses, such as public and/or relay IP addresses. For example, the controller 201 may send an allocate request to the server 203 such as a STUN/TURN server to inquire the network addresses. Correspondingly, the controller 201 may receive an allocate success response containing the requested network addresses from the server 203.

In accordance with an exemplary embodiment, the server 203 may collect the public IP address of the controller 201 by using the STUN protocol. Alternatively or additionally, the relay IP address of the controller 201 also may be determined by the server 203 with the TURN protocol. Optionally, the controller 201 may inquire 213 both of its internal and external network addresses from the server 203, even though the controller 201 may have got its local address in the cellular network as the internal network address. The server 203 may transmit a response 214 to the controller 201. The response 214 may comprise at least one of the external network addresses (and optionally the internal network address) of the controller 201.

Similarly, the drone 204 connected to the cellular network can register 212 to the message broker 202, for example, by sending a connect request command and receiving a connect request acknowledgement message correspondingly from the message broker 202. By inquiring 216 address information from the server 203, the drone 204 can obtain at least one of its external network addresses (and optionally internal network address) in a response 217 from the server 203. In accordance with some exemplary embodiments, the drone 204 may be directly allocated a public address instead of an internal network address when accessing to the network. In this case, the drone 204 may have no internal network address. Also, it may be possible for the controller 201 to be assigned one or more external network addresses without an internal network address.

It could be realized that the schematic message flow described in FIG. 2 is generally set forth as a logical flow, and the depicted order and the labeled steps are for convenience only but not for limitation. Therefore, the order in which the connection setup procedure occurs may not strictly adhere to the order of the corresponding steps shown in FIG. 2. For example, the drone 204 may register to the message broker 202 and get the network addresses from the server 203 simultaneously with, earlier than or later than the controller 201.

In some cases, the controller 201 and the drone 204 may not be able to communicate with each other directly, for example, because they are assigned dynamic and local IP addresses. In addition, some firewall rules may not allow a direct connection between the controller 201 and the drone 204. Thus, the communication between the controller 201 and the drone 204 may have to go through a firewall. In this circumstance, a public path (such as the path 112 shown in FIG. 1) or a relay path (such as the path 113 shown in FIG. 1) may be desirable compared with a local path (such as the path 111 shown in FIG. 1). However, the local path may have better delay performance than the public path and the relay path. Further, if the relay path is used, the latency and bandwidth may not be manageable. Therefore, it may be beneficial to find an optimal path among local, public and relay paths for the communication between the controller 201 and the drone 204, according to different application scenarios and network requirements.

In accordance with an embodiment of the present disclosure, connectivity checks may be performed to find the optimal path. As shown in FIG. 2, the controller 201 may initiate an ICE procedure by sending 215 an invite message to the drone 204 through the message broker 202. In the invite message (for example, in the form of a MQTT command), the controller 201 may share its address information (such as the local, public and relay addresses) to the drone 204. Correspondingly, the drone 204 may respond to the invite message by sending 218 an answer message to the controller 201 through the message broker 202. The answer message (such as an invite acknowledgement message) may comprise the drone's address information (such as the local, public and relay addresses) shared with the controller 201.

Optionally, the controller 201 may send an ICE command to the drone 204 through the message broker 202 to initiate an ICE procedure 219.

Correspondingly, the drone 204 may send an ICE acknowledgement message to the controller 201 through the message broker 202 to inform the controller 201 that the ICE procedure 219 may be started.

In accordance with an embodiment of the present disclosure, the controller 201 can execute the ICE procedure 219 by performing connectivity checks for each addresses of the drone 204. For example, all the IP address pairs for the controller 201 and the drone 204 may be looped to check connectivity. In particular, the controller 201 may check connectivity for the local address, the public address and the relay address of the drone 204 by using the local address of the controller 201. According to an exemplary embodiment, a binding request may be sent from the controller 201 to the drone 204 to check the connectivity of each IP address of the drone 204. If the check is successful, the drone 204 may reply by sending a success response back to the controller 201.

It may be possible that the checks on more than one address of the drone 204 may be successful, which means there may be at least two candidate paths are available for the controller 201 to connect to the drone 204. Thus, a selection criterion may be predefined to nominate an optimal path from these candidate paths. The selection criterion may consider delay, bandwidth, reliability and/or other potential requirements. Optionally, the drone 204 also can check connectivity for each addresses of the controller 201 in the ICE procedure 219, and determine an optimal path for connecting to the controller 201 according to a specified selection criterion.

According to an exemplary embodiment, user datagram protocol (UDP) paths are expected in the ICE procedure. In this case, the results of connectivity checks performed by the controller 201 and the drone 204 may be different, because UDP is a connectionless transport layer protocol and the network contexts for the controller 201 and the drone 204 may not be necessarily the same. Accordingly, the optimal path from the controller 201 to the drone 204 and the optimal path from the drone 204 to the controller 201 may be separately treated. It will be appreciated that other transport protocol such as transmission control protocol (TCP) also may be applicable to route exploration between the controller 201 and the drone 204. In this case, the controller 201 and the drone 204 can negotiate the optimal path between them, for example, through a TCP three-way handshake procedure. Accordingly, the same optimal path may be selected for the traffic from the controller 201 to the drone 204 and the traffic from the drone 204 to the controller 201.

When the optimal path is nominated for the controller 201 in the ICE procedure, the controller 201 may send 220 a VPNUP command to the message broker 202, as shown in FIG. 2. The message broker 202 may forward or relay the VPNUP command to the drone 204. Optionally, the drone 204 may send a VPNUP acknowledgement message back to the controller 201. Then a VPN procedure may be performed 221 via the nominated path to establish a VPN tunnel/connection for the controller 201 and the drone 204. The VPN tunnel/connection can carry ethernet layer2 messages and any other IP messages including TCP messages. Alternatively, the VPN procedure may be initiated by the drone 204, for example, by sending a VPNUP command to the controller 201 through the message broker 202, so as to setup a VPN tunnel/connection for the controller 201 and the drone 204, although it is not shown in FIG. 2.

In another exemplary embodiment, a robot instead of the drone 204 in FIG. 2 may establish a P2P connection with the controller 201. The robot can fly in the air, walk on the ground, and/or perform specific behaviors according to some commands from the controller 201. On account of unlimited control distance and robust connection, the action radius of the robot can be enlarged, and the controlling accuracy may be increased. In this way, MTC implementation would have more application scenarios than before. For simplicity, the following will continue the embodiments related to a drone to illustrate methods and apparatus with regard to the present disclosure.

Figure 3:
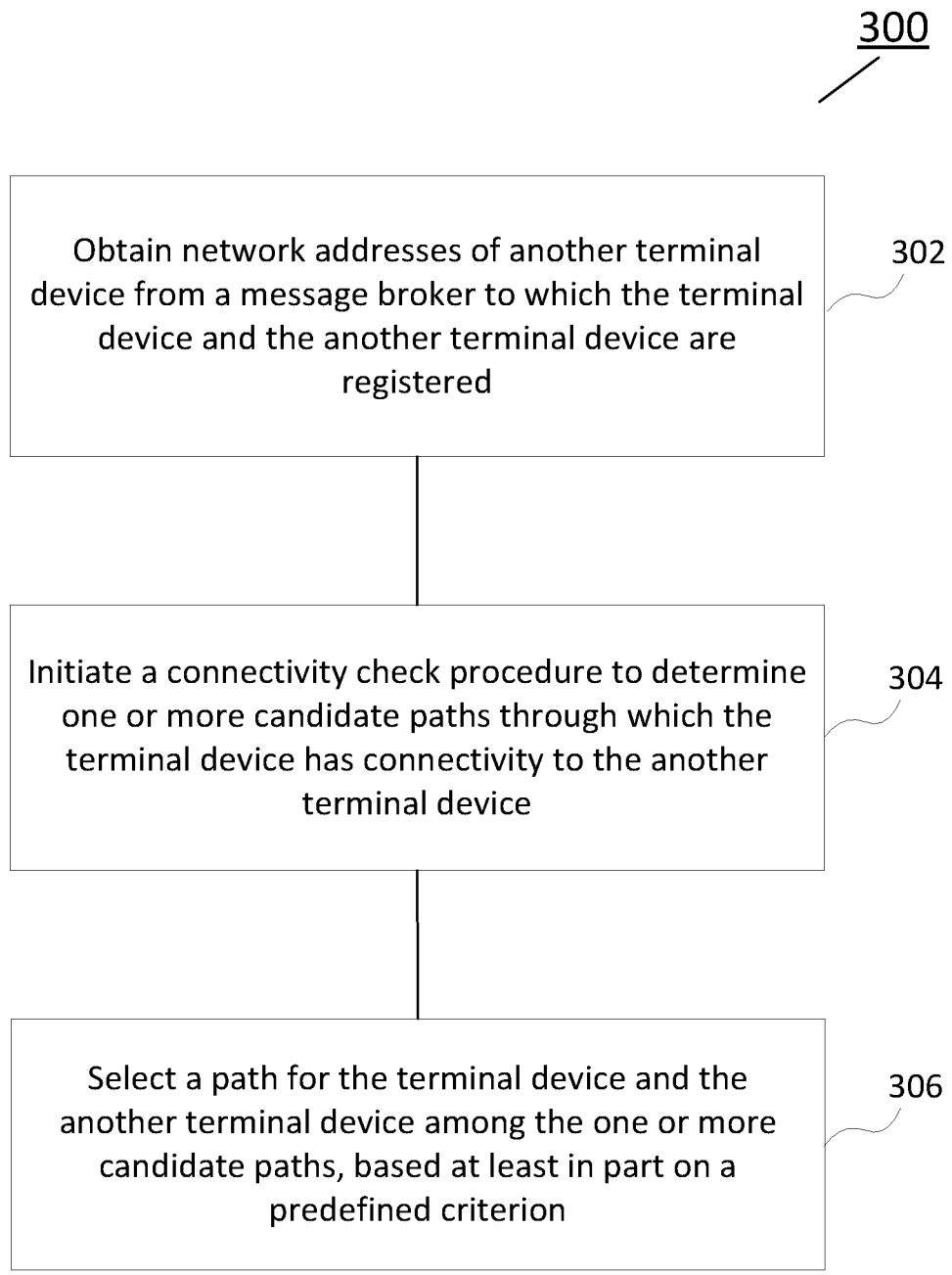
FIG. 3 is a flowchart illustrating a method according to some embodiments of the present disclosure.

FIG. 3 is a flowchart illustrating a method 300 according to some embodiments of the present disclosure. The method 300 illustrated in FIG. 3 may be performed by an apparatus implemented in a terminal device or communicatively coupled to a terminal device. In accordance with some exemplary embodiments, the terminal device may comprise a UE, a drone, a robot, a controller, an in-vehicle information system, and/or other appropriate computing device which can be used to communicate with another terminal device via a P2P connection over a cellular network. According to an exemplary embodiment, the terminal device may be operated as an initiator of a connectivity check procedure for another terminal device.

In accordance with an exemplary embodiment, at least one of the terminal device and the another terminal device may be connected to a cellular network such as a LTE/NR network. For instance, both the terminal device and the another terminal device may be located in a cellular network and can access to the Internet through the cellular network. Alternatively, one of the terminal device and the another terminal device may be a computer connecting to the Internet via a cable broadband connection, while the other may be a wireless device accessing to the Internet through the cellular network. Some traffics such as sensing data or control signaling may need to be communicated between the terminal device and the another terminal device. Thus, it may be required to setup a connection for the terminal device and the another terminal device.

According to the exemplary method 300 illustrated in FIG. 3, the terminal device (such as the controller 201 or the drone 204) can obtain network addresses of another terminal device (such as the drone 204 or the controller 201) from a message broker (such as the message broker 202) to which the terminal device and the another terminal device are registered, as shown in block 302. In an exemplary embodiment, the network addresses of the another terminal device may comprise one or more network addresses inquired by the another terminal device from a server (such as the server 203) which supports traversal for NAT. As described in connection with FIG. 2, the network addresses of the another terminal device may comprise internal and/or external network addresses of the another terminal device.

Optionally, the terminal device may send its network addresses to the another terminal device through the message broker. For example, the network addresses of the terminal device may be carried in an invite message to the another terminal device, as shown in FIG. 2. Alternatively, the terminal device may share its network addresses with the another terminal device as requested.

In accordance with an exemplary embodiment, the terminal device may inquire at least one of its network addresses from the server which supports traversal for NAT. As described with respect to FIG. 2, one or more network addresses inquired from the server may comprise an internal network address, one or more external network addresses (such as a public address and/or a relay address), or any combination thereof.

In order to determine whether the network addresses of the another terminal device obtained from the message broker are valid addresses for a communication path from the terminal device to the another terminal device, a connectivity check procedure such as an ICE procedure may be performed. In accordance with an exemplary embodiment, the terminal device may initiate a connectivity check procedure to determine one or more candidate paths through which the terminal device has connectivity to the another terminal device, as shown in block 304. In accordance with an exemplary embodiment, the connectivity check procedure may be based at least in part on STUN, TURN and/or any other suitable techniques.

Since the connectivity check procedure is performed for the network addresses of the another terminal device, it could be realized that the one or more candidate paths are from at least two paths associated with the network addresses of the another terminal device. The at least two paths may comprise two or more of a local path, a public path and a relay path. The local path is associated with an internal network address of the another terminal device, and the public path and the relay path are associated with external network addresses of the another terminal device.

According to the exemplary method 300 illustrated in FIG. 3, the terminal device can select a path for the terminal device and the another terminal device among the one or more candidate paths, based at least in part on a predefined criterion, as shown in block 306. In accordance with an exemplary embodiment, the predefined criterion may comprise one or more of the following requirements: a delay requirement, a bandwidth requirement, and a reliability requirement. It will be appreciated that other appropriate factors also may be considered when selecting an optimal path for the terminal device and the another terminal device.

In accordance with an exemplary embodiment, the terminal device may establish a P2P connection for the terminal device and the another terminal device via the selected path over the cellular network. During the establishment of the P2P connection, the terminal device may exchange one or more connection setup messages with the another terminal device through the message broker. According to an exemplary embodiment, the P2P connection may be established based at least in part on a VPN procedure as described in connection with FIG. 2. Through the VPN connection, the terminal device can communicate various kinds of data or commands with the another terminal device.

Figure 4:
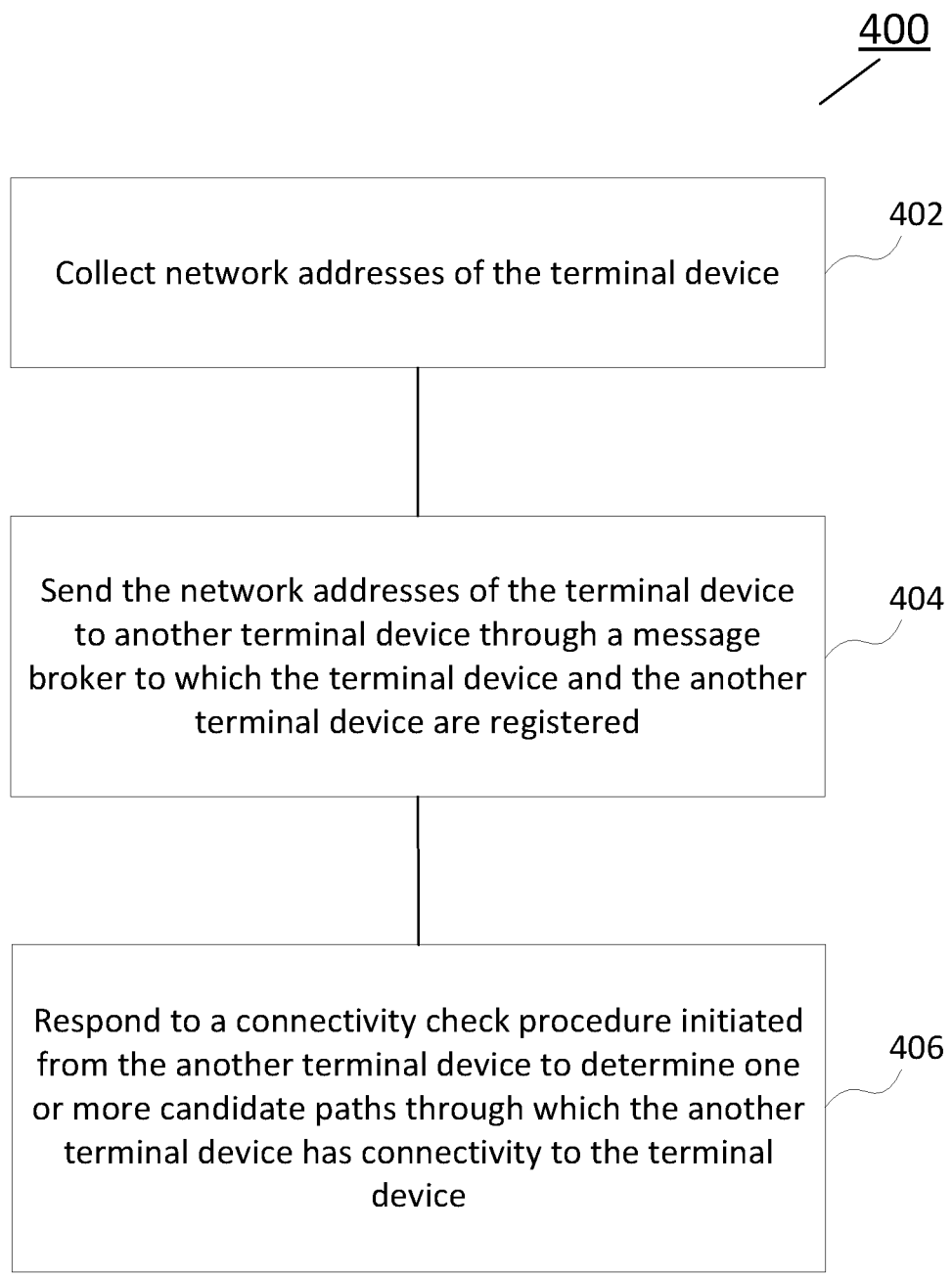
FIG. 4 is a flowchart illustrating a method according to some embodiments of the present disclosure.

FIG. 4 is a flowchart illustrating a method 400 according to some embodiments of the present disclosure. The method 400 illustrated in FIG. 4 may be performed by an apparatus implemented in a terminal device or communicatively coupled to a terminal device. In accordance with some exemplary embodiments, the terminal device may comprise a UE, a drone, a controller, an in-vehicle information system, and/or other appropriate computing device which can be used to communicate with another terminal device via a P2P connection over a cellular network. According to an exemplary embodiment, the terminal device described in connection with FIG. 4 may be operated as a responder of a connectivity check procedure initiated by the another terminal device. As mentioned previously, at least one of the terminal device and the another terminal device may be connected to a cellular network such as a LTE/NR network.

According to the exemplary method 400 illustrated in FIG. 4, the terminal device (such as the drone 204 or the controller 201) may collect its network addresses, as shown in block 402. In accordance with an exemplary embodiment, the collection of the network addresses of the terminal device may comprise inquiring at least one of the network addresses of the terminal device from a server (such as the server 203) which supports traversal for NAT. For example, the terminal device may get its internal network address from the cellular network, and at least one external network address from the server.

The terminal device may send its network addresses to another terminal device through a message broker (such as the message broker 202) to which the terminal device and the another terminal device are registered, as shown in block 404. Optionally, the terminal device may obtain network addresses of the another terminal device from the message broker. The network addresses of the another terminal device may comprise one or more network addresses inquired by the another terminal device from the server (such as the server 203).

According to an exemplary embodiment, the terminal device may respond to a connectivity check procedure initiated from the another terminal device to determine one or more candidate paths through which the another terminal device has connectivity to the terminal device, as shown in block 406. As mentioned previously, the connectivity check procedure may be based at least in part on STUN, TURN and/or other suitable technique. By using the connectivity check procedure, a path for the terminal device and the another terminal device may be selected by the another terminal device from the one or more candidate paths based at least in part on a predefined criterion. For example, the predefined criterion may comprise a delay requirement, a bandwidth requirement, a reliability requirement, or any combination thereof.

In accordance with an exemplary embodiment, the one or more candidate paths are from at least two paths associated with the network addresses of the terminal device. The at least two paths may comprise two or more paths of a local path, a public path and a relay path. The local path is associated with an internal network address of the terminal device, and the public path and the relay path are associated with external network addresses of the terminal device.

In accordance with an exemplary embodiment, a P2P connection may be established for the terminal device and the another terminal device via the selected path over the cellular network. In order to establish the P2P connection, the terminal device may exchange one or more connection setup messages (such as VPN connection setup messages) with the another terminal device through the message broker.

Figure 5:
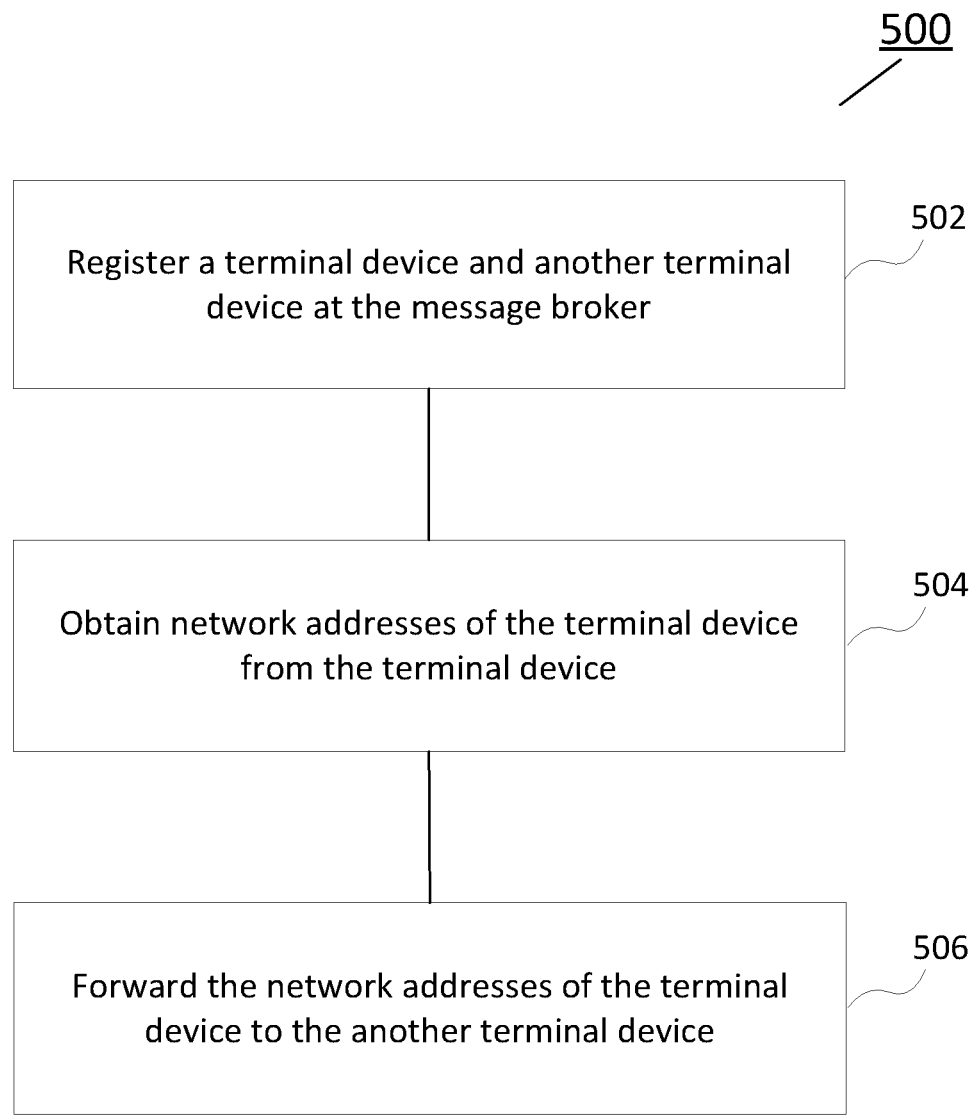
FIG. 5 is a flowchart illustrating a method according to some embodiments of the present disclosure.

FIG. 5 is a flowchart illustrating a method 500 according to some embodiments of the present disclosure. The method 500 illustrated in FIG. 5 may be performed by an apparatus implemented in a message broker or communicatively coupled to a message broker. In accordance with some exemplary embodiments, the message broker may comprise a server, a relay station, an intermediate equipment, and/or other appropriate device which can implement one or more communication message protocols (such as the MQTT protocol) for signaling exchanges between two terminal devices.

According to the exemplary method 500 illustrated in FIG. 5, a terminal device and another terminal device may be registered at the message broker, as shown in block 502. As described with respect to FIG. 3 and FIG. 4, at least one of the terminal device and the another terminal device is connected to a cellular network. The message broker (such as the message broker 202) may coordinate messages and/or signaling exchanged between the terminal device and the another terminal device, so that a P2P connection can be established for the two terminal devices on top of cellular connectivity.

In accordance with an exemplary embodiment, the message broker may obtain network addresses of the terminal device from the terminal device, as shown in block 504. For example, the network addresses of the terminal device may be carried in an invite command or an invite acknowledgement message from the terminal device. Then, the message broker can forward the network addresses of the terminal device to the another terminal device, as shown in block 506, so as to enable a path through which the another terminal device has connectivity to the terminal device to be selected by the another terminal device from at least two paths associated with the network addresses of the terminal device.

Optionally, the message broker may obtain network addresses of the another terminal device from the another terminal device. The network addresses of the another terminal device may be forwarded to the terminal device from the message broker, so as to enable a path through which the terminal device has connectivity to the another terminal device to be selected by the terminal device from at least two paths associated with the network addresses of the another terminal device.

In accordance with an exemplary embodiment, a P2P connection setup procedure may be initiated by the terminal device or the another terminal device, in response to the path for the terminal device and the another terminal device being selected. In this case, the message broker can communicate one or more connection setup messages exchanged between the terminal device and the another terminal device. The one or more connection setup messages (such as a VPNUP command or a VPNUP acknowledgement message) may be related to establishment of a P2P connection for the terminal device and the another terminal device.

Figure 6:
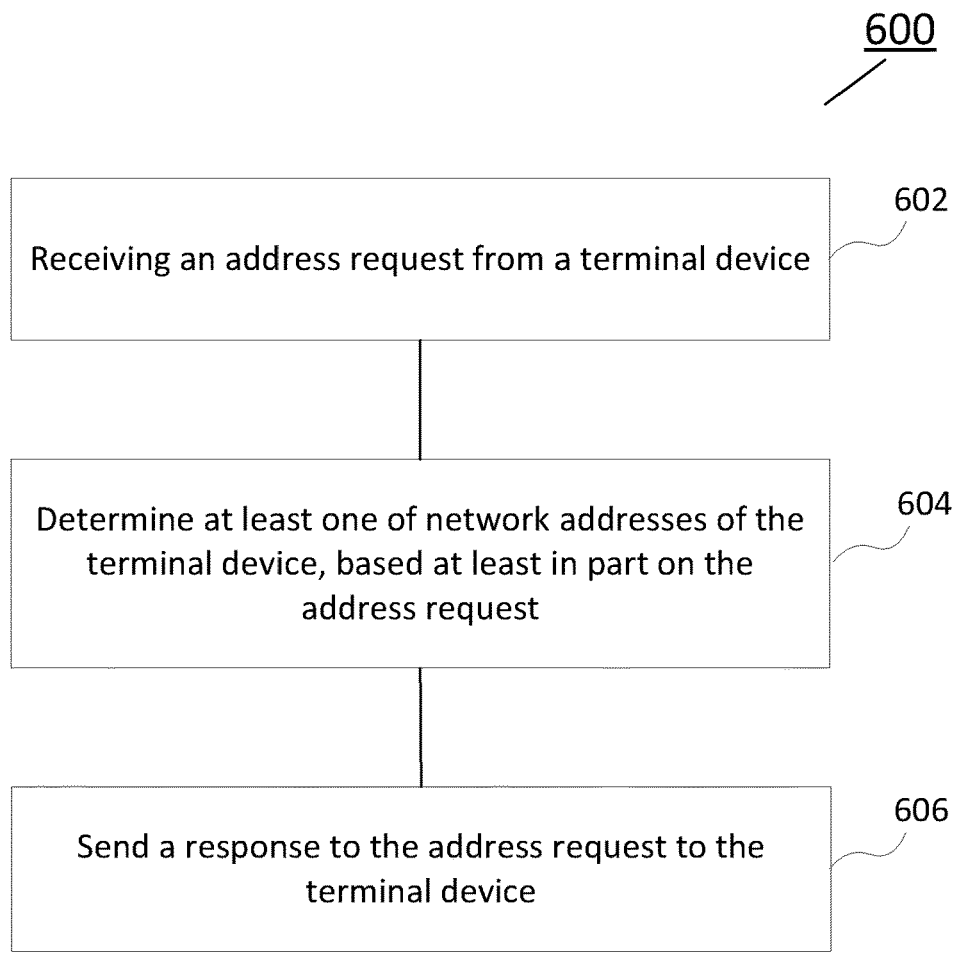
FIG. 6 is a flowchart illustrating a method according to some embodiments of the present disclosure.

FIG. 6 is a flowchart illustrating a method 600 according to some embodiments of the present disclosure. The method 600 illustrated in FIG. 6 may be performed by an apparatus implemented in a server or communicatively coupled to a server. In accordance with some exemplary embodiments, the server may be implemented as an ICE server which can enable a P2P connection to be established for two terminal devices on top of cellular connectivity.

According to the exemplary method 600 illustrated in FIG. 6, the server may receive an address request from a terminal device (such as the drone 204 or the controller 201), as shown in block 602. The server can support traversal for NAT, for example, by performing a STUN protocol, a TURN protocol and/or any other proper protocol.

In accordance with an exemplary embodiment, the server can determine at least one of network addresses of the terminal device based at least in part on the address request, as shown in block 604. For example, the determined one or more network addresses may comprise an internal network address and/or at least one external network address of the terminal device.

Then, the server may send a response to the address request to the terminal device, as shown in block 606. The response may comprise the at least one of the network addresses of the terminal device. In accordance with an exemplary embodiment, the network addresses of the terminal device may be applicable to enabling a path through which another terminal device has connectivity to the terminal device to be selected by the another terminal device from at least two paths associated with the network addresses of the terminal device. As mentioned previously, at least one of the terminal device and the another terminal device is connected to a cellular network.

Optionally, the server may receive another address request from the another terminal device (such as the drone 204 or the controller 201). Based at least in part on the another address request, the server can determine at least one of network addresses of the another terminal device. Then the server may send another response to the another address request to the another terminal device. The another response may comprise the at least one of the network addresses of the another terminal device. Similarly, the network addresses of the another terminal device may be applicable to enabling a path through which the terminal device has connectivity to the another terminal device to be selected by the terminal device from at least two paths associated with the network addresses of the another terminal device.

In accordance with an exemplary embodiment, by using the network addresses of the peer device, the terminal device and/or the another terminal device may perform a connectivity check procedure to select an optimal path for connection establishment, as described with respect to FIG. 3 and FIG. 4. Correspondingly, a connection setup procedure may be executed to setup a P2P connection between the terminal device and the another terminal device via the optimal path over cellular connectivity.

The proposed solution according to one or more exemplary embodiments can enable a P2P connection to be established for two terminal devices such as a drone and its controller over a cellular network. Taking the advantage of the proposed connection establishment mechanism makes it possible to select an optimal path from different paths for two terminal devices to establish a P2P connection. In this way, a terminal device can find an optimal path meeting a certain criterion to setup a P2P connection with another terminal device over the cellular network, which may help to achieve low latency and/or high bandwidth.

According to some scenarios, a drone/robot may send pictures or real-time video taken by it, or some sensing information detected by it to a receiver which may not be the same entity as a controller of the drone/robot. Optionally, the drone/robot may send data to the controller and the receiver in a meanwhile. The receiver may be located at a different position from the controller, which means that they have different address information. Therefore, a P2P connection between the drone/robot with the controller and a P2P connection between the drone/robot with the receiver can be established respectively, according to the above proposed solution.

The various blocks shown in FIGS. 3-6 may be viewed as method steps, and/or as operations that result from operation of computer program code, and/or as a plurality of coupled logic circuit elements constructed to carry out the associated function(s). The schematic flow chart diagrams described above are generally set forth as logical flow chart diagrams.

As such, the depicted order and labeled steps are indicative of specific embodiments of the presented methods. Other steps and methods may be conceived that are equivalent in function, logic, or effect to one or more steps, or portions thereof, of the illustrated methods. Additionally, the order in which a particular method occurs may or may not strictly adhere to the order of the corresponding steps shown.

Figure 7:
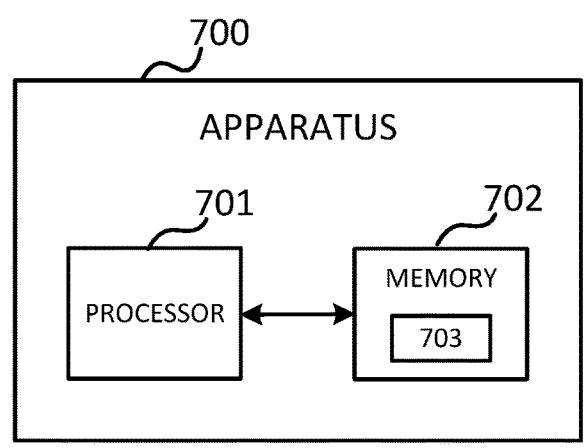
FIG. 7 is a block diagram illustrating an apparatus according to some embodiments of the present disclosure.

FIG. 7 is a block diagram illustrating an apparatus 700 according to various embodiments of the present disclosure. As shown in FIG. 7, the apparatus 700 may comprise one or more processors such as processor 701 and one or more memories such as memory 702 storing computer program codes 703. The memory 702 may be non-transitory machine/processor/computer readable storage medium. In accordance with some exemplary embodiments, the apparatus 700 may be implemented as an integrated circuit chip or module that can be plugged or soldered into a terminal device as described with respect to FIG. 3 or FIG. 4.

In some implementations, the one or more memories 702 and the computer program codes 703 may be configured to, with the one or more processors 701, cause the apparatus 700 at least to perform any operation of the method as described in connection with FIG. 3.

In some implementations, the one or more memories 702 and the computer program codes 703 may be configured to, with the one or more processors 701, cause the apparatus 700 at least to perform any operation of the method as described in connection with FIG. 4.

In some implementations, the one or more memories 702 and the computer program codes 703 may be configured to, with the one or more processors 701, cause the apparatus 700 at least to perform any operation of the method as described in connection with FIG. 5.

In some implementations, the one or more memories 702 and the computer program codes 703 may be configured to, with the one or more processors 701, cause the apparatus 700 at least to perform any operation of the method as described in connection with FIG. 6.

Alternatively or additionally, the one or more memories 702 and the computer program codes 703 may be configured to, with the one or more processors 701, cause the apparatus 700 at least to perform more or less operations to implement the proposed methods according to the exemplary embodiments of the present disclosure.

Figure 8:
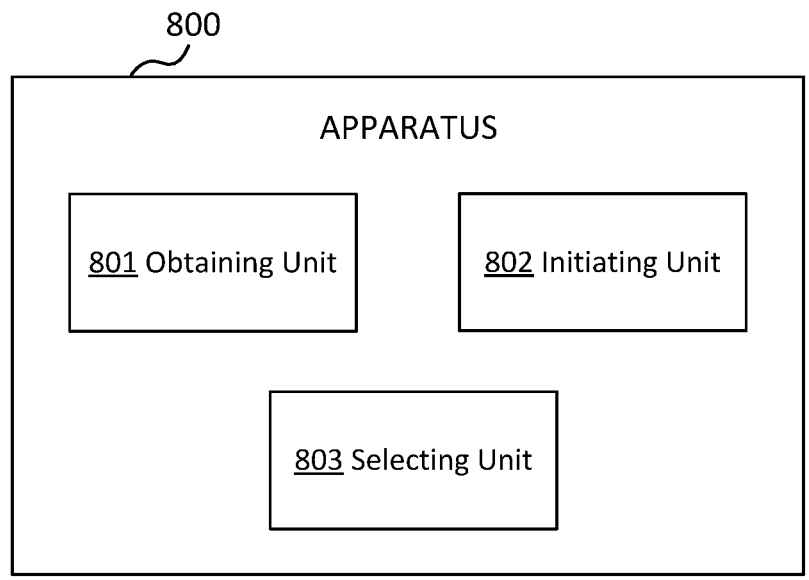
FIG. 8 is a block diagram illustrating an apparatus according to some embodiments of the present disclosure.

FIG. 8 is a block diagram illustrating an apparatus 800 according to some embodiments of the present disclosure. As shown in FIG. 8, the apparatus 800 may comprise an obtaining unit 801, an initiating unit 802 and a selecting unit 803. In an exemplary embodiment, the apparatus 800 may be implemented at a terminal device such as a drone or a controller. The obtaining unit 801 may be operable to carry out the operation in block 302, the initiating unit 802 may be operable to carry out the operation in block 304, and the selecting unit 803 may be operable to carry out the operation in block 306. Optionally, the obtaining unit 801, the initiating unit 802 and/or the selecting unit 803 may be operable to carry out more or less operations to implement the proposed methods according to the exemplary embodiments of the present disclosure.

Figure 9:
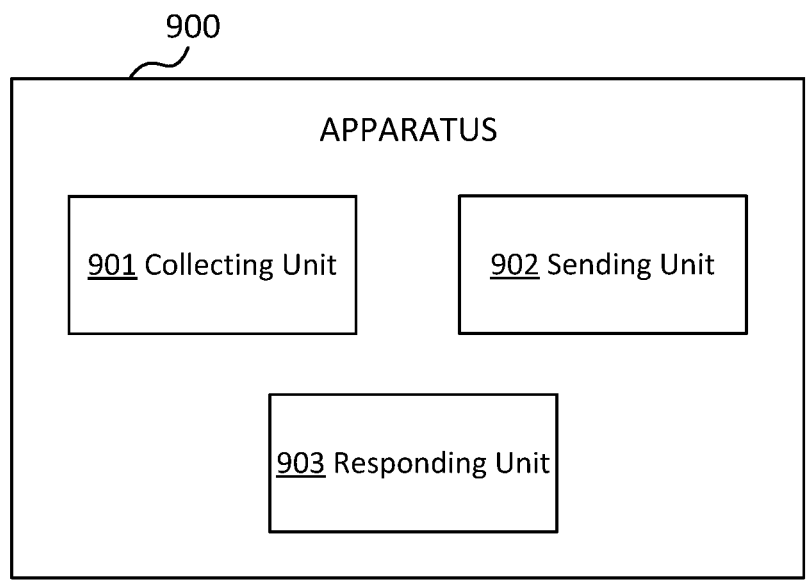
FIG. 9 is a block diagram illustrating an apparatus according to some embodiments of the present disclosure.

FIG. 9 is a block diagram illustrating an apparatus 900 according to some embodiments of the present disclosure. As shown in FIG. 9, the apparatus 900 may comprise a collecting unit 901, a sending unit 902 and a responding unit 903. In an exemplary embodiment, the apparatus 900 may be implemented at a terminal device such as a drone or a controller. The collecting unit 901 may be operable to carry out the operation in block 402, the sending unit 902 may be operable to carry out the operation in block 404, and the responding unit 903 may be operable to carry out the operation in block 406. Optionally, the collecting unit 901, the sending unit 902 and/or the responding unit 903 may be operable to carry out more or less operations to implement the proposed methods according to the exemplary embodiments of the present disclosure.

Figure 10:
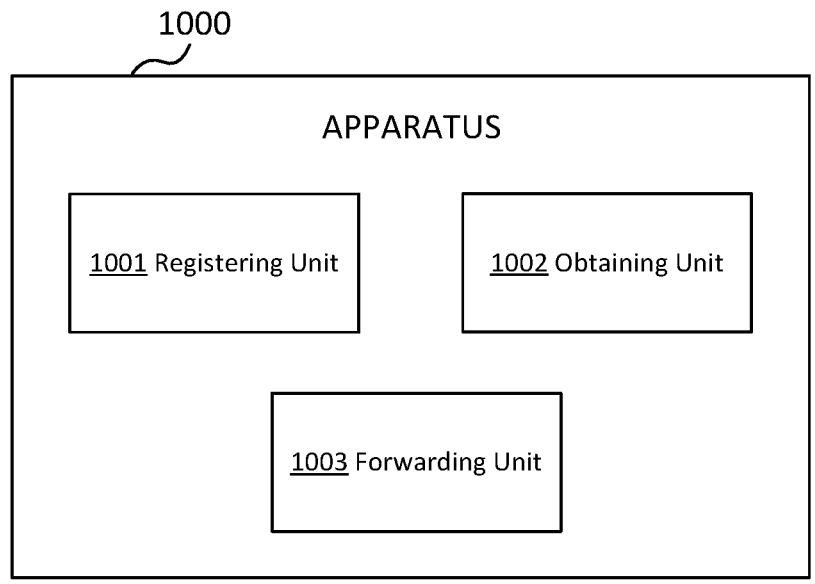
FIG. 10 is a block diagram illustrating an apparatus according to some embodiments of the present disclosure.

FIG. 10 is a block diagram illustrating an apparatus 1000 according to some embodiments of the present disclosure. As shown in FIG. 10, the apparatus 1000 may comprise a registering unit 1001, an obtaining unit 1002 and a forwarding unit 1003. In an exemplary embodiment, the apparatus 1000 may be implemented at a message broker such as a MQTT server. The registering unit 1001 may be operable to carry out the operation in block 502, the obtaining unit 1002 may be operable to carry out the operation in block 504, and the forwarding unit 1003 may be operable to carry out the operation in block 506. Optionally, the registering unit 1001, the obtaining unit 1002 and/or the forwarding unit 1003 may be operable to carry out more or less operations to implement the proposed methods according to the exemplary embodiments of the present disclosure.

Figure 11:
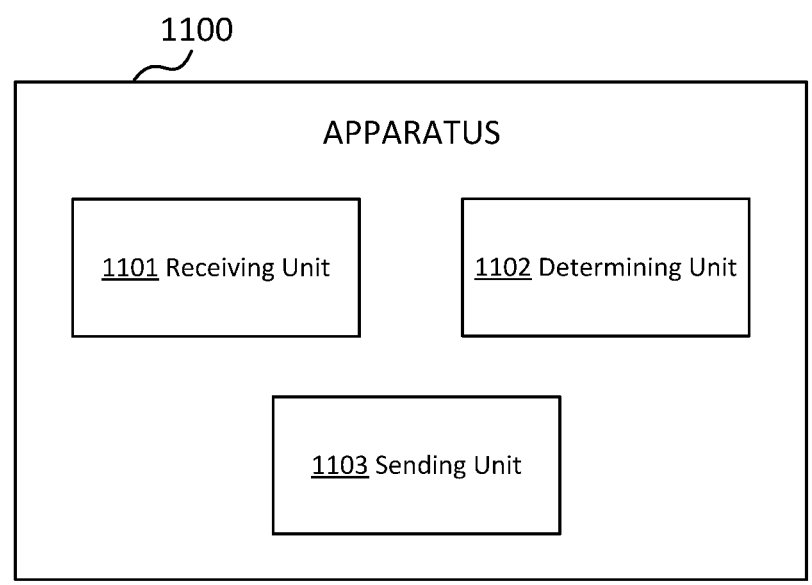
FIG. 11 is a block diagram illustrating an apparatus according to some embodiments of the present disclosure.

FIG. 11 is a block diagram illustrating an apparatus 1100 according to some embodiments of the present disclosure. As shown in FIG. 11, the apparatus 1100 may comprise a receiving unit 1101, a determining unit 1102 and a sending unit 1103. In an exemplary embodiment, the apparatus 1100 may be implemented at a server such as an ICE server. The receiving unit 1101 may be operable to carry out the operation in block 602, the determining unit 1102 may be operable to carry out the operation in block 604, and the sending unit 1103 may be operable to carry out the operation in block 606. Optionally, the receiving unit 1101, the determining unit 1102 and/or the sending unit 1103 may be operable to carry out more or less operations to implement the proposed methods according to the exemplary embodiments of the present disclosure.

In general, the various exemplary embodiments may be implemented in hardware or special purpose chips, circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, random access memory (RAM), etc. As will be appreciated by one of skill in the art, the function of the program modules may be combined or distributed as desired in various embodiments. In addition, the function may be embodied in whole or partly in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

What is claimed is:

1. An apparatus, comprising:
   one or more processors; and
   one or more memories comprising computer program codes,
   the one or more memories and the computer program codes configured to, with the one or more processors, cause the apparatus at least to:
   obtain network addresses of another apparatus from a message broker to which the apparatus and the another apparatus are registered, wherein at least one of the apparatus and the another apparatus is connected to a cellular network;
   initiate a connectivity check procedure to determine two or more candidate paths through which the apparatus is able to establish a peer-to-peer connection with the another apparatus, wherein each of the two or more candidate paths are from at least two paths associated with the network addresses of the another apparatus; and
   select a path for the peer-to-peer connection between the apparatus and the another apparatus among the two or more candidate paths, based at least in part on a predefined criterion,
   wherein the predefined criterion comprises one or more of (a) delay requirements, (b) a bandwidth requirement, and (c) a reliability requirement.

2. The apparatus according to claim 1, wherein the at least two paths comprise two or more of a local path, a public path and a relay path, and
   wherein the local path is associated with an internal network address of the another terminal device, and the public path and the relay path are associated with external network addresses of the another terminal device.

3. The apparatus according to claim 1, wherein the one or more memories and the computer program codes are configured to, with the one or more processors, cause the apparatus to inquire at least one of network addresses of the terminal device from a server which supports traversal for network address translation.

4. The apparatus according to claim 1, wherein the connectivity check procedure is based at least in part on at least one of the following techniques:
   session traversal utilities for network address translation; and
   traversal using relays around network address translation.

5. The apparatus according to claim 1, wherein the one or more memories and the computer program codes are configured to, with the one or more processors, cause the apparatus to establish the peer-to-peer connection for the terminal device and the another terminal device via the selected path over the cellular network.

6. The apparatus according to claim 5, wherein the one or more memories and the computer program codes are configured to, with the one or more processors, cause the apparatus to exchange one or more connection setup messages with the another terminal device through the message broker.

7. An apparatus, comprising:
   one or more processors; and
   one or more memories comprising computer program codes,
   the one or more memories and the computer program codes configured to, with the one or more processors, cause the apparatus at least to:
   register a terminal device and another terminal device at the apparatus, wherein at least one of the terminal device and the another terminal device is connected to a cellular network;
   obtain network addresses of the terminal device from the terminal device; and
   forward the network addresses of the terminal device to the another terminal device, to enable a path through which the another terminal device is able to establish a peer-to-peer connection with the terminal device to be selected by the another terminal device from at least two candidate paths associated with the network addresses of the terminal device, based at least in part on a predefined criterion,
   wherein the predefined criterion comprises one or more of (a) delay requirements, (b) a bandwidth requirement, and (c) a reliability requirement.

8. The apparatus according to claim 7, wherein the one or more memories and the computer program codes are configured to, with the one or more processors, cause the apparatus to communicate one or more connection setup messages exchanged between the terminal device and the another terminal device, wherein the one or more connection setup messages are related to establishment of the peer-to-peer connection for the terminal device and the another terminal device.

9. An apparatus, comprising:
   one or more processors; and
   one or more memories comprising computer program codes,
   the one or more memories and the computer program codes configured to, with the one or more processors, cause the apparatus at least to:
   receive an address request from the terminal device, wherein the apparatus supports traversal for network address translation;
   determine at least one of network addresses of the terminal device, based at least in part on the address request; and send a response to the address request to the terminal device, wherein the response comprises the at least one of the network addresses of the terminal device, and wherein the network addresses of the terminal device are applicable to enabling a path through which another terminal device is able to establish a peer-to-peer connection with the terminal device to be selected by the another terminal device from at least two candidate paths associated with the network addresses of the terminal device, based at least in part on a predefined criterion, wherein the predefined criterion comprises one or more of (a) delay requirements, (b) a bandwidth requirement, and (c) a reliability requirement, and wherein at least one of the terminal device and the another terminal device is connected to a cellular network.

* * * * *